Jan. 11, 1966       J. P. STEFAN       3,228,382
TEMPERATURE RESPONSIVE FAN
Filed Nov. 13 1964                     2 Sheets-Sheet 1

JOHN P. STEFAN
INVENTOR

BY John R. Faulkner
Ernest A. Beutler
ATTORNERYS

United States Patent Office 3,228,382
Patented Jan. 11, 1966

3,228,382
TEMPERATURE RESPONSIVE FAN
John P. Stefan, Birmingham, Mich., assignor to Ford Motor Company, Dearborn, Mich., a corporation of Delaware
Filed Nov. 13, 1964, Ser. No. 411,015
11 Claims. (Cl. 123—41.12)

This invention relates to a temperature responsive fan and more particularly to a temperature responsive cooling fan for a liquid cooled internal combustion engine.

It has been proposed to provide some form of temperature responsive actuating device for the fans that are employed in heat exchanging systems. The temperature responsive control is provided to reduce the overall cost of operating the system by operating the fan only intermittently or to prevent circulation at times when the temperature does not warrant it. With the increasing number of power consuming accessories used in conjunction with automotive internal combustion engines it has been proposed to drive the engine cooling fan only at times when the coolant temperature requires it. The cooling fan can require considerable driving power and it is advantageous to uncouple it when the coolant temperature does not require its operation. Uncoupling of the cooling fan at low coolant temperatures also improves the warm up characteristics of the engine.

The commercially used temperature responsive engine cooling fans are not directly responsive to the temperature of the liquid coolant of the engine. Rather, they are responsive to the temperature of the air that circulates through the radiator. In many instances the air temperature does not give a true indication of the coolant temperature. Although devices have been proposed that are directly responsive to the coolant temperature, these devices are complicated and costly to produce.

It, therefore, is the principal object of this invention to provide a cooling fan for an internal combustion engine that is directly responsive to coolant temperature.

Most temperature responsive fan drives embody some form of element that has thermal properties for actuating the drive. Examples of such elements are bimetallic springs, metals having high coefficients of thermal expansion and wax pellets. Certain of these types of devices deteriorate with age or their thermal properties may change with age. In addition, in the case of engine cooling systems, a change in engine coolant may make it desirable to operate at higher or lower temperatures. It is necessary to replace the temperature responsive element in these instances.

It, therefore, is a further object of this invention to provide a temperature responsive fan drive that does not rely upon an element having thermal characteristics as an actuating device.

It is a still further object of this invention to provide a temperature responsive fan drive for an internal combustion engine that is self compensating for changes in operating characteristics of the coolant.

A heat exchanging system embodying this invention includes a heat exchanger and means for circulating a first fluid through the heat exchanger. The last named means includes a venturi section through which at least a portion of the first fluid flows. The first fluid is adapted to vaporize at the throat of the venturi section at a predetermined temperature. A fan is additionally provided to circulate a second fluid across the heat exchanger for a heat exchange between the first and second fluids. Means are provided to generate a signal when the first fluid vaporizes within the throat of the venturi section. Means responsive to the signal of the last named means is provided to drive the fan.

Further objects and advantages of this invention will become more apparent as this description proceeds, particularly when considered in conjunction with the accompanying drawings, wherein.

Figure 1:
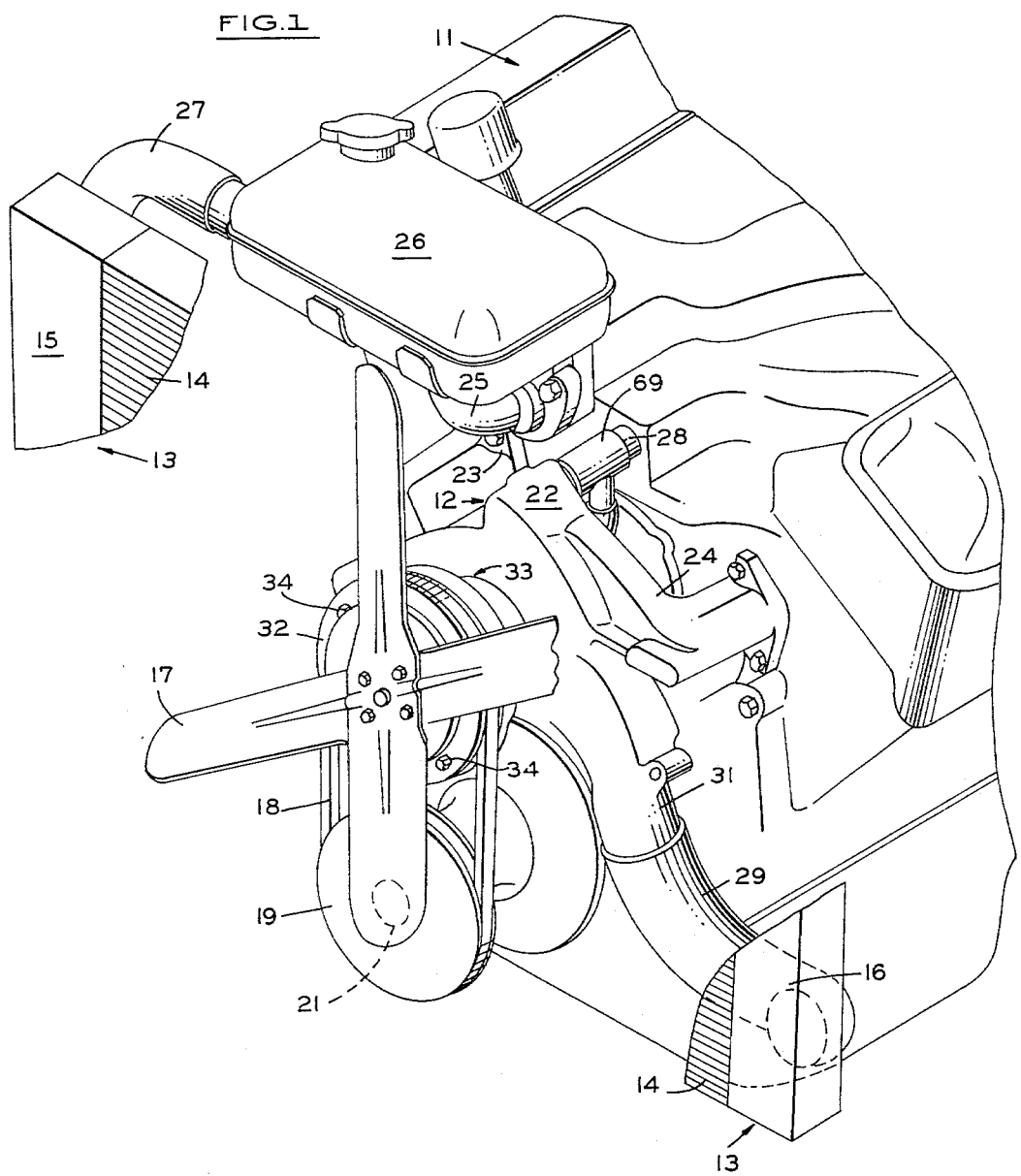
FIGURE 1 is a perspective view, with portions broken away, of a liquid cooled internal combustion engine embodying this invention.

Referring now in detail to the drawings and in particular to FIGURE 1, a liquid cooled internal combustion engine is indicated generally by the reference numeral 11. The cylinder block and cylinder heads of the engine are provided with a cooling jacket through which a liquid coolant is circulated by means of a coolant pump, indicated generally by the reference numeral 12. The actual construction of the cooling jacket per se does not form a part of this invention and it will not be described in detail.

The heat generated by the operation of the engine is dissipated to the atmosphere from a cross flow radiator, indicated generally by the reference numeral 13. The radiator 13 has a core 14 and header tanks 15 and 16 positioned at each side of the core 14. A fan 17 is provided to circulate air through the radiator core 14. A flexible belt 18 encircles a pulley 19 which is affixed to the engine crankshaft 21 for driving the fan 17 and the coolant pump 12 in a manner which will become more apparent as this description proceeds.

The coolant pump 12 has a cast outer housing 22 having a pair of branch arms 23 and 24 that are affixed to the forward wall of the engine 11. Coolant delivery passages extend through the branch arms 23 and 24 to deliver coolant from the coolant pump 12 to the cooling jacket of the engine 11.

After the coolant has been circulated through the cooling jacket of the engine, it may be discharged from a coolant outlet fitting 25 that is positioned at the front of the engine. The coolant outlet fitting 25 exends to the lower surface of an expansion tank 26 that is positioned between the engine 11 and the radiator 13 at a point that is somewhat higher than the upper surface of the radiator 13. A flexible hose 27 interconnects the expansion tank 26 with the upper end of the radiator header tank 15. Coolant which has been heated by the operation of the engine 11 therefore may be circulated through the radiator 13 from the coolant outlet fitting 25, expansion tank 26 and flexible hose 27.

A thermostatic valve (not shown) of any known type may be positioned at the outlet fitting 25 to control the flow of coolant through the radiator 13 and to maintain a normal operating temperature for the engine. When the thermostatic valve is closed, the coolant pump 12 may continue to circulate coolant through the cooling jacket of the engine. The coolant that is circulated is returned to the coolant pump 12 by a bypass fitting 28 that is positioned at the front of the engine. The interconnection of bypass fitting 28 with the coolant pump 12 will be described by particular reference to FIGURE 2 as this description proceeds.

The coolant that is circulated through the radiator 13 is returned to the coolant pump 12 by means of a flexible hose 29 that extends from the lower end of the header tank 16 to an inlet fitting 31 formed integrally with the pump housing 22.

Figure 2:
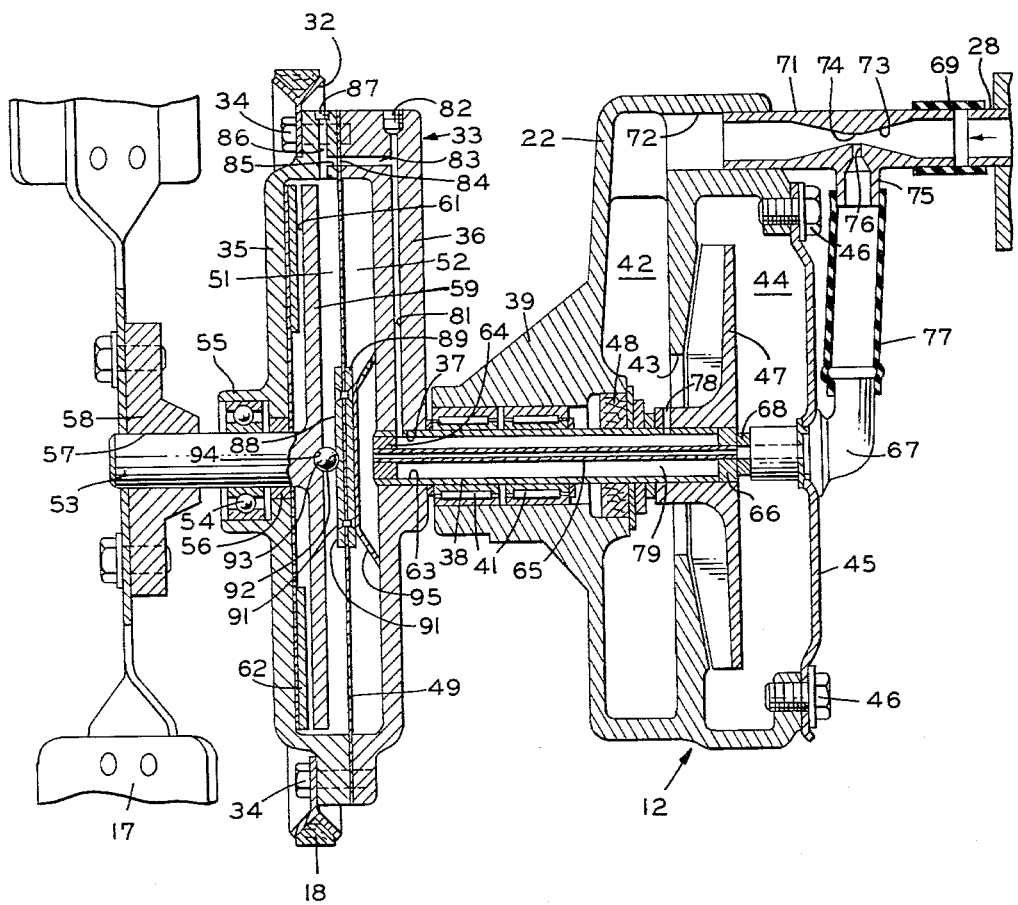
FIGURE 2 is a cross-sectional view taken in a vertical plane through the axis of the driving shaft for the fan and coolant pump of the engine shown in FIGURE 1.

Referring now in detail to FIGURE 2, the crankshaft driven belt 18 engages a sheet metal pulley 32 that is affixed for rotation with the housing of a pressure responsive clutch mechanism, indicated generally by the reference numeral 33, by a plurality of bolts 34. The clutch housing includes a forward annular member 35 and a rearward annular member 36 that are also held together by the bolts 34. The rearward annular member 36 has a bore 37 that receives a hollow driving shaft 38. The annular member 36 is press fitted upon the forward end of the driving shaft 38 so that the clutch housing rotates in unison with the driving shaft 38. The driving shaft 38 is journaled at its center for rotation within a forwardly extending projection 39 of the coolant pump outer housing 22 by a roller bearing assembly, indicated generally by the reference numeral 41.

The coolant pump outer housing 22 forms an annular pump inlet cavity 42 that receives coolant from the radiator 13 through the inlet fitting 31. An axially extending passage 43 connects the inlet cavity 42 with the center of a pumping cavity 44. The rear face of the pumping cavity 44 is closed by a cover plate 45 that is affixed to the rear wall of the outer housing 22 by a plurality of bolts 46. A centrifugal impeller 47 is press fitted onto the inner end of the driving shaft 38. When the driving shaft 38 is rotated by the engine crankshaft 21 during engine operation, coolant will be circulated from the pumping cavity 44 to the cooling jacket of the engine 11 by the impeller 47. A seal 48 encircles the driving shaft 38 adjacent the forward end of the pump inlet cavity 42 to prevent loss of engine coolant.

A flexible diaphragm 49 is clamped between the front and rear annular clutch housing annular members 35 and 36 to divide the annular cavity formed between these members into a first fluid tight cavity 51 and a second fluid tight cavity 52. A fan drive shaft 53 is journaled by a roller bearing assembly 54 in a hub 55 of the forward annular member 35. A seal 56 engages the periphery of the fan drive shaft 53 to insure against leakage to or from the cavity 51. The forward end of the fan drive shaft 53 is press fitted within a bore 57 formed within a hub 58 of the fan 17.

The rear end of the fan drive shaft 53 terminates in an integral disc 59 that is received within the cavity 51. The disc 59 has a frictional surface 61 that opposes a frictional surface 62 that is affixed to the surface of the annular member 35 that defines the front wall of the first fluid tight cavity 51. In addition to being rotatably supported by the hub 55, the fan driving shaft 53 is axially movable with respect to the clutch housing. Axial movement of the shaft 53 brings the frictional surfaces 61 and 62 into engagement so that a driving relationship may be established between the clutch housing and the fan drive shaft 53. Engagement of the frictional surfaces 61 and 62 is accomplished by varying the fluid pressure within the second fluid tight cavity 52 in the manner now to be described.

The hollow driving shaft 38 has a longitudinally extending bore 63 that is closed at its forward end by a plug 64. A hollow tube 65 extends through the plug 64 and runs coaxially with the driving shaft 38. The rearward end of the driving shaft 38 is closed by a plug 66. The tube 64 also extends through the plug 66. The tube 64 rotates with the driving shaft 38 because of its connection with the plugs 64 and 66. The rear end of the tube 65 extends into a fitting 67 that is affixed to the cover plate 45 of the coolant pump 12. A resilient seal 68 encircles the tube 65 to prevent leakage from the pumping cavity 44 into the interior of the tube 65 and also precludes leakage from the tube 65 into the pumping cavity 44.

As has been previously noted, a bypass fitting 28 is provided in the engine cooling jacket to permit coolant to flow into the pump inlet cavity 42 without circulating through the radiator 13. A flexible hose 69 interconnects the bypass fitting 28 with a tubular member 71 that is received in a bore 72 formed in the coolant pump outer housing 22. The bore 72 extends into the pump inlet cavity 42. A venturi section 73 having a throat 74 is formed within the tubular member 71. A nipple 75 also is formed in the tubular member 71 adjacent the throat 74. A fluid passage 76 extends through the nipple 75 and terminates at the venturi throat 74. A flexible hose 77 interconnects the nipple 75 with the fitting 67. It should be apparent that the tubular member 65, fitting 67, hose 77 and passage 76 interconnect the fluid cavity 52 with the venturi section throat 74.

The fluid tight cavity 51 is exposed to the cooling system pressure by means of a passage 78 that extends through the hub of the coolant pump impeller 47. The passage 78 extends through the hollow driving shaft 38 and terminates within an annular clearance 79 formed between the outer diameter of the tube 65 and the bore 63 of the driving shaft 38. A radial passage 81 extends from the clearance 79 through the rear annular member 36 of the clutch housing and through the forward end of the driving shaft 38. The outer end of the radial passage 81 is closed by a plug 82. A transversely extending passage 83 intersects the radial passage 81. An aperture 84 is formed in the diaphragm 49 at the forward end of the passage 83. A corresponding, axially extending passage 85 is formed in the forward annular member 35. A radial passage 86 intersects the axially extending passage 85 and extends from the first fluid cavity 51 to a plug 87 that closes its outer end.

First and second rigid plates 88 and 89 are affixed to opposite sides of the center of the diaphragm 49 by rivets 91. The first plate 88 has a socket 92 that accommodates a hardened steel ball 93. The disc 59 also has a complementary socket 94 that accommodates the ball 93. A Belleville spring 95 is contained within the fluid tight cavity 52 and normally urges the diaphragm 49 in a direction that tends to enlarge the volume of a cavity 52 and decrease the volume of a cavity 51. The Belleville spring 95 exerts an axial pressure upon the fan drive shaft 53 through the plate 88 and steel ball 93. This axial pressure tends to cause the frictional surfaces 61 and 62 to move into engagement.

*Operation*

The liquid coolant flowing through the venturi section 73 will cause decreased pressure or a partial vacuum at the throat 74. The venturi section 73 is so proportioned that the coolant that is employed will be a liquid at the throat 74 when the coolant is at temperaures below the desired engine operating temperature or the temperature at which it is desired to drive the fan 17. When this temperature is exceeded, the coolant will flash or vaporize at the throat 74. Vaporization of the coolant at the throat 74 will cause a significant decrease in the vacuum at the throat 74 or an increase in the absolute pressure. This pressure differential is employed to actuate the clutch mechanism 33.

When the engine is operating with the liquid coolant at a temperature less than is necessary to cause the fan 17 to operate, there will be a decreased pressure experienced at the venturi throat 74. This decreased pressure is transmitted through the tube 65 to the fluid tight cavity 52. Normal cooling system pressure will be transmitted through the annular clearance 79 and related passages formed in the clutch housing to the fluid cavity 51. The pressure differential between the cavities 51 and 52 is sufficient to overcome the action of the Belleville spring 95 and the frictional surfaces 61 and 62 may move out of axial engagement. Rotation of the clutch housing therefore will not be accompanied by rotation of the fan drive shaft 53. That is, the clutch housing will rotate and the fan drive shaft 53 will idle in the bearing assembly 54.

When the coolant reaches the temperature at which it flashes in the venturi throat 74, a decrease in vacuum or increase in absolute pressure will occur. The decreased vacuum that is experienced within the cavity 52 will no longer be sufficient to overcome the action of the Belleville spring 95. The Belleville spring 95 will then urge the plate 88 and ball 93 in a forward direction to cause the frictional surface 61 on the disc 59 to engage the frictional surface 62 on the clutch housing. The clutch housing and fan drive shaft 53 will then rotate in unison to operate the fan 17. The fan will circulate air through the radiator core 14 until the engine coolant temperature falls below the temperature at which the coolant vaporizes at the venturi throat 74.

It should be readily apparent that once the system is designed to accommodate a given engine coolant, it will be self compensating for various coolants. Coolants having lower boiling points will vaporize at lower temperatures in the venturi throat 74 to cause the frictional surfaces 61 and 62 to engage at a lower temperature. In a like manner, coolants having higher boiling points will cause a delay in engagement of the clutch 33. Variations in the degree of pressurization of the cooling system also will be compensated for through a change in the flash point. The fact that the fluid cavity 51 also experiences cooling system pressure will aid in the self compensating characteristics.

It is to be understood that this invention is not limited to the exact construction shown and described, but that various changes and modificaions may be made without departing from the spirit and scope of the invention, as designed by the appended claims.

I claim:
1. A heat exchanging system comprising a heat exchanger, means for circulating a first fluid through said heat exchanger, said means including a venturi section through which at least a portion of said first fluid flows, a fan for circulating a second fluid across said heat exchanger for a heat transfer between said fluids, said first fluid being adapted to vaporize at the throat of said venturi section at a predetermined temperature, means for generating a signal when said first fluid vaporizes within said throat, and means for driving said fan in response to the signal of said last named means.

2. A cooling system for a liquid cooled internal combustion engine comprising a cooling jacket for said engine, a coolant pump for circulating a liquid coolant, a radiator, conduit means for interconnecting said coolant pump, said cooling jacket and said radiator, a venturi section positioned in a portion of said conduit means, a fan for circulating air across said radiator for a heat transfer from said radiator to the air, the liquid coolant flowing through said venturi section being adapted to vaporize at the throat of said venturi section at a predetermined coolant temperature, means for generating a signal when the coolant vaporizes within said throat, and means for driving said fan in response to the signal of said last named means.

3. A heat exchanging system comprising a heat exchanger, means for circulating a first fluid through said heat exchanger, said means including a venturi section through which at least a portion of the first fluid flows, the first fluid being adapted to vaporize at the throat of said venturi section at a predetermined temperature, a fan for circulating a second fluid across said heat exchanger for heat transfer between said fluids, means for sensing the pressure differential caused at said throat by the vaporization of the first fluid, and means including pressure responsive means for driving said fan in response to the sensing of a pressure variation by said last named means.

4. A cooling system for a liquid cooled internal combustion engine comprising a cooling jacket for said engine, a coolant pump for circulating a liquid coolant, a radiator for dissipating the heat generated by said engine, conduit means interconnecting said coolant pump, said cooling jacket and said radiator, a venturi section positioned in a portion of said conduit means, the liquid coolant flowing through said venturi section being adapted to vaporize at the throat of said venturi section at a predetermined coolant temperature, a fan for circulating air across said radiator, means for sensing the pressure differential caused at said throat by the coolant vaporization, and means including pressure responsive means for driving said fan in response to the sensing of a pressure variation by said last named means.

5. A cooling system for a liquid cooled internal combustion engine comprising a cooling jacket for said engine, a coolant pump driven by said engine for circulating a liquid coolant, a radiator for dissipating the heat generated by said engine, conduit means interconnecting said coolant pump, said cooling jacket and said radiator, a venturi section positioned in a portion of said conduit means, the liquid coolant flowing through said venturi section being adapted to vaporize at the throat of said venturi section at a predetermined coolant temperature, a fan adapted to be driven by said engine for circulating air across said radiator, pressure responsive clutch means for drivingly coupling said fan to said engine, means for sensing the pressure differential caused at said throat by the coolant vaporization, and means for actuating said pressure responsive clutch for driving said fan in response to the sensing of a pressure variation by said last named means.

6. A heat exchanging system comprising a heat exchanger, means for circulating a first fluid through said heat exchanger, said last named means including a venturi section through which at least a portion of the first fluid circulates, a fan for circulating a second fluid across said heat exchanger for a heat exchange between said fluids, means including a fluid pressure responsive clutch for driving said fan, said fluid responsive clutch comprising biasing means for urging said clutch to one of its engaged and disengaged positions, fluid pressure means opposing said biasing means and urging said clutch in the other of its positions, and conduit means interconnecting said fluid pressure means with said venturi section at its throat for transmitting the pressure at said throat to said fluid pressure means, said first fluid being adapted to vaporize at the throat of said venturi section at a predetermined temperature for decreasing the force exerted by said fluid pressure means whereby said biasing means may urge said clutch into the first of said positions.

7. A cooling system for an internal combustion engine comprising a cooling jacket, a coolant pump drivingly coupled to said engine, a radiator, conduit means interconnecting said coolant pump, said cooling jacket, and said radiator, a venturi section positioned in a portion of said conduit means, a fan for circulating air across said radiator, means including a fluid pressure responsive clutch for drivingly coupling said fan to said engine, said fluid pressure responsive clutch comprising biasing means for urging said clutch to its engaged position, fluid pressure means opposing said biasing means and urging said clutch to its disengaged position, and conduit means interconnecting said fluid pressure means with said venturi section at its throat for transmitting the pressure at said throat to said fluid pressure means, the coolant flowing through said venturi section being adapted to vaporize at a predetermined temperature for decreasing the force exerted by fluid pressure means whereby said biasing means may urge said clutch into engagement to drive said fan.

8. A temperature responsive fan drive comprising a driving shaft, a fan, a clutch housing adapted to be rotated by said driving shaft, a diaphragm defining an enclosed fluid tight cavity within said clutch housing, a first frictional member supported for rotation within said clutch housing, means affixing said first frictional member to said fan, a second frictional member affixed to said clutch housing, said first frictional member being supported for relative axial movement into and out of engagement with said second frictional member, means for transmitting axial motion from said diaphragm to said first frictional member, biasing means for urging said diaphragm in a first direction tending to enlarge said fluid tight cavity, a venturi section, means for circulating a fluid through said venturi section in response to operation of said driving member, the fluid flowing through said venturi section being adapted to vaporize at a predetermined temperature, and conduit means interconnecting said venturi section at its throat with the interior of said fluid tight cavity, the decreased pressure generated within said fluid tight cavity by the flow through said throat being sufficient to resist movement of said diaphragm in said first direction when the fluid flowing through said throat is in the liquid state and insufficient to preclude movement in said first direction when the fluid flowing through said venturi section becomes a vapor at said throat.

9. A cooling system for a liquid cooled internal combustion engine comprising a cooling jacket for said engine, a coolant pump driven by said engine for circulating a liquid coolant, a radiator for dissipating the heat generated by said engine, conduit means interconnecting said coolant pump, said cooling jacket and said radiator, a venturi section in a portion of said conduit means, the liquid coolant being adapted to vaporize at the throat of said venturi section at a predetermined temperature, a fan for circulating air across said radiator, a temperature responsive clutch for drivingly coupling said fan to said engine comprising a clutch housing drivingly coupled to said engine, a diaphragm defining an enclosed fluid tight cavity within said clutch housing, a first frictional member affixed to said fan and supported for rotation within said clutch housing, a second frictional member affixed to said clutch housing, said first frictional member being supported for relative axial movement into and out of engagement with said second frictional member, means for transmitting axial motion from said diaphragm to said first frictional member, biasing means for urging said diaphragm in a first direction tending to enlarge said fluid type cavity and move said frictional members into axial engagement, and conduit means interconnecting the throat of said venturi section with said fluid tight cavity, the decreased pressure within said cavity generated by the flow of coolant through said throat being sufficient to resist engagement of said frictional members when the coolant flowing through said throat is in the liquid state and insufficient to preclude engagement of said frictional members when the coolant flowing through said venturi section becomes a vapor at said throat.

10. A cooling system for a liquid cooled internal combustion engine comprising a cooling jacket for said engine, a driving shaft, a coolant pump including an impeller affixed to said driving shaft for circulating a liquid coolant, a radiator for dissipating the heat generated by said engine, conduit means interconnecting said coolant pump, said cooling jacket and said radiator, said conduit means including a venturi section, the liquid coolant being adapted to vaporize at the throat of said venturi section at a predetermined temperature, a fan adapted to circulate air across said radiator, clutch means for drivingly coupling said fan to said driving shaft comprising a clutch housing affixed to said driving shaft, a diaphragm defining an enclosed fluid tight cavity within said clutch housing, a first frictional member affixed to said fan and supported for rotation relative to said clutch housing, a second frictional member affixed to said clutch housing, said first frictional member being supported for relative axial movement into and out of engagement with said second frictional member, means for transmitting axial motion from said diaphragm to said first frictional member, biasing means urging said diaphragm in a first axial direction for axially moving said first frictional member into engagement with said second frictional member, and conduit means including a fluid passage extending through said driving shaft interconnecting said fluid tight cavity with said venturi section at its throat, the decreased pressure within said fluid tight cavity generated by the flow through said throat being sufficient to resist movement of said diaphragm and said first frictional member in said first direction when the coolant flowing through said throat is in the liquid state and insufficient to preclude engagement of said frictional members when the coolant flowing through said venturi section becomes a vapor at said throat.

11. A cooling system for a liquid cooled internal combustion engine comprising a driving shaft driven by said engine, a cooling jacket for said engine, a coolant pump including an impeller affixed to said driving shaft for circulating a liquid coolant, a radiator for dissipating the heat generated by said engine, conduit means interconnecting said coolant pump, said cooling jacket and said radiator, said conduit means including a venturi section through which at least a portion of the coolant flows, said coolant being adapted to vaporize at the throat of said venturi section at a predetermined temperature, a fan adapted to circulate air across said radiator, clutch means for drivingly coupling said fan to said driving shaft comprising a clutch housing, a diaphragm defining the enclosed first and second fluid tight cavities within said clutch housing, a first frictional member affixed to said fan and supported for rotation within said first fluid tight cavity, a second frictional member affixed to said clutch housing within said first fluid tight cavity, said first frictional member being supported for relative axial movement into and out of engagement with second frictional member, means for transmitting axial movement from said diaphragm to said first frictional member, biasing means for urging said first frictional member into axial engagement with said second frictional member, said biasing means also tending to enlarge the volume of said second fluid tight cavity, conduit means including a fluid passage extending through said driving shaft for transmitting the flow of coolant pressure within said cooling system to said first fluid tight cavity, and conduit means including a second fluid passage extending through said driving shaft interconnecting said second fluid tight cavity to said venturi section at its throat, the decreased pressure within said second fluid tight cavity generated by the flow through said throat being sufficient to resist engagement of said frictional members when coolant flowing through said throat is in the liquid state and insufficient to prevent engagement of said frictional members when the coolant flowing through said venturi section becomes a vapor at said throat.

No references cited.

KARL J. ALBRECHT, *Primary Examiner.*